United States Patent [19] [11] 3,758,049
Staar [45] Sept. 11, 1973

[54] RAPID DRIVE DEVICE FOR TAPE TRANSFERS

[75] Inventor: Theophiel Clement Josef Lodewijk Staar, Kraainem, Belgium
[73] Assignee: Staar, S.A., Brussels, Belgium

[22] Filed: Oct. 30, 1970
[21] Appl. No.: 85,649

[30] Foreign Application Priority Data
Nov. 7, 1969 Belgium ............................ 81,313

[52] U.S. Cl. ............................ 242/201, 242/198
[51] Int. Cl. ...................... G11b 15/30, G11b 15/44
[58] Field of Search .................. 242/198, 199, 200, 242/197, 201, 202, 203, 204, 186, 189, 190, 206, 208, 209, 207, 210; 274/4 C, 4 D, 4 E, 11 C, 11 D, 11 E

[56] References Cited

UNITED STATES PATENTS 2,920,148 1/1960 Munroe ............................ 242/201
3,606,202 9/1971 Williams et al. .................... 242/202

*Primary Examiner*—George F. Mautz
*Attorney*—Wolfe, Hubbard, Leydig, Voit and Osann

[57] ABSTRACT

A tape transport is provided with fast forward and fast rewind drives and associated controls and a mechanism for relating the fast forward and rewind function to the direction in which the tape is moving at its normal playing speed when the fast forward or fast rewind control is actuated.

4 Claims, 8 Drawing Figures

INVENTOR
THEOPHIEL CLEMENT JOZEF LODEWIJK STAAR
by: Wolfe, Hubbard, Leydig, Voit & Osann
ATTYS.

INVENTOR

THEOPHIEL CLEMENT JOZEF LODEWIJK STAAR by: Wolfe, Hubbard, Leydig, Voit & Osann

ATTYS.

INVENTOR
THEOPHIEL CLEMENT JOZEF LODEWIJK STAAR
by: Wolfe, Hubbard, Leydig, Voit & Osann
ATTYS.

INVENTOR

THEOPHIEL CLEMENT JOZEF LODEWIJK STAAR by: Wolfe, Hubbard, Leydig, Voit & Osann

ATTYS.

RAPID DRIVE DEVICE FOR TAPE TRANSFERS

The invention relates generally to recording and/or playback apparatus, and more particularly concerns drives and associated controls for rapidly driving a sound tape in a forward or reverse direction.

Sound tape transports for tape cassettes have found increasing acceptance recently. In such tape transports which have bi-directional drives for tape movement at normal playing speed in both directions for sound playback from or recording on separate recording tracks, and which also have fast forward and fast rewind drives for the tape, the operator must determine the direction in which the playing tape is moving before actuating the fast tape drive controls so that he can decide on the fast speed control which he must actuate to drive the tape in the required direction. But such determination is often difficult to make since the direction of tape movement at normal playing speed may not be clearly apparent.

Accordingly, it is the overall object of this invention to provide fast forward and rewind drives for tape transports with bi-directional drives, which eliminate the need for the operator to determine the direction of tape movement at normal playing speed before actuating the fast speed controls.

It is an allied object of this invention to provide fast forward and rewind drives for tape transports with bi-directional drives, which sense the direction to tape movement at normal playing speed when the fast speed controls are actuated and which relate the fast forward or rewind function to the direction of tape movement at the moment the controls are actuated.

Stated more specifically, it is an object to provide fast forward drives for tape transports with bi-directional drives, which drive a recording tape rapidly in the same direction in which the tape is moving at normal playing speed when the fast forward control is actuated. It is a correlated object to provide fast rewind drives for such tape transports, which drive the recording tape rapidly in the opposite direction to that in which the tape is moving at normal playing speed when the fast rewind control is actuated.

A related object is to provide fast forward and rewind drives and associated controls for tape transports with bi-directional drives, which automatically reverse the direction of tape movement when the recording tape being driven at high speed reaches one of its ends and, therefore, continue to perform the same rapid forward or rewind function without interruption when the end of the tape is reached.

A further object is to provide fast forward and rewind drives and associated controls for cassette tape transports, which are simple to operate, yet reliable and rugged in design and construction.

Other objects and advantages of the invention will become apparent upon reading the following detailed description and upon reference to the drawings, in which.

Figure 2:
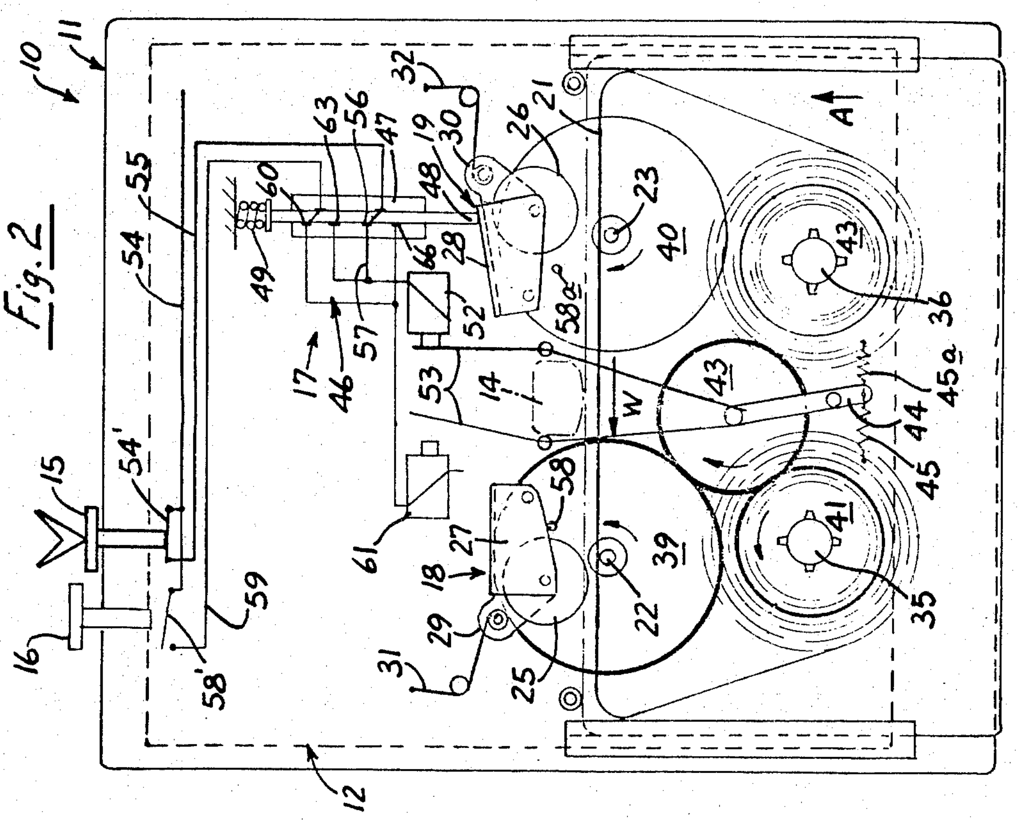
FIG. 2 is a plan view of a tape transport similar to FIG. 1 and showing the position of the apparatus therein as the tape is driven rapidly to the left in the direction W.

While the invention will be described in connection with a preferred and alternate embodiment, it will be understood that it is not intended to limit the invention to those embodiments. On the contrary, it is intended to cover all alternatives, modifications, and equivalents as may be included within the spirit and scope of the invention.

Turning first to FIGS. 1–4, there is shown a tape transport 10 of the type disclosed in U.S. Pat. No. 3,385,534 for recording and playing back recording tapes contained within cassettes. As disclosed in said U.S. patent, the transport includes a drive for moving the tape in one direction at normal recording or playback speed. In the present case, the transport 10 includes portions of a bi-directional drive of the type described in co-pending Staar application Ser. No. 738,619, now U.S. Pat. No. 3,604,714, for moving the tape selectively in either direction at normal speed. The present invention relating to a fast speed drive is particularly applicable to a tape transport having a bi-directional drive, but is not restricted to tape transports for cassettes or to a particular form of drive, and is applicable to tape transports with bi-directional drives generally which accept tape on reels or in cartridges.

In this case, the transport 10 generally comprises a frame assembly 11 and a plate assembly 12 which is movable with respect to the frame assembly 11 along a path in the direction indicated by arrows A and B. The frame assembly 11 comprises a tape recording and playback head 14, a tape fast forward drive push button or actuator 15, a tape fast reverse drive push button or actuator 16, electrical switching circuitry 17, and pinch roller assemblies 18 and 19. The transport is also provided with guides 20 along which a cassette is slidably movable in its own plane into a playing position (FIG. 1) with the tape against the playback head 14.

The movable plate assembly 12, as shown in detail in said U.S. Pat. No. 3,385,534, is carried by a parallelogram (not shown) for movement together with and normal to a cassette as it is moved to playing position along the guides 20. Movement of the plate 12 is utilized to penetrate tape drive components on the plate into openings in the cassette for engagement with elements therein. Among the components mounted upon the movable plate assembly 12 are the tape driving capstans 22, 23 and tape reel spindles 35, 36 together with apparatus (not shown) for rotating the capstans 22, 23 and the spindles 35, 36.

Figure 1:
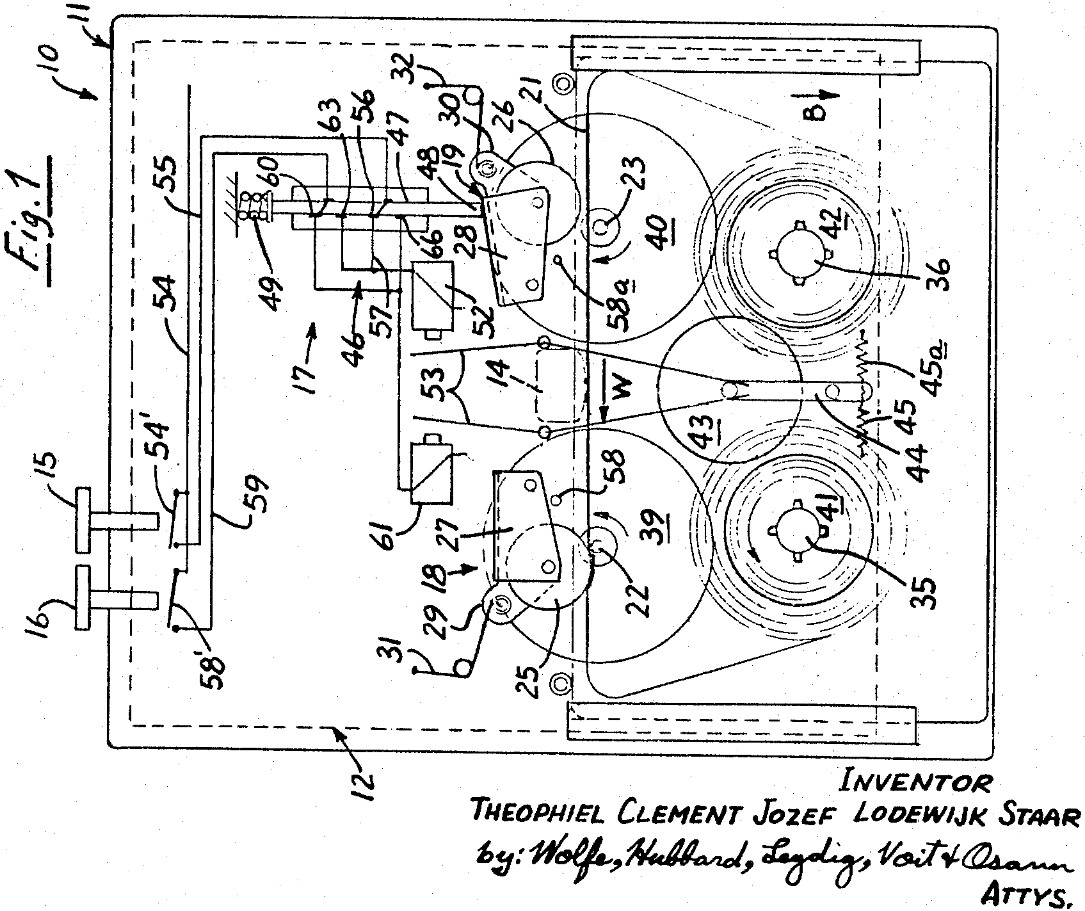
FIG. 1 is a plan view of a tape transport embodying the invention, having a sound tape being driven at a normal recording or playback speed in the direction W or to the left as viewed.
Figure 3:
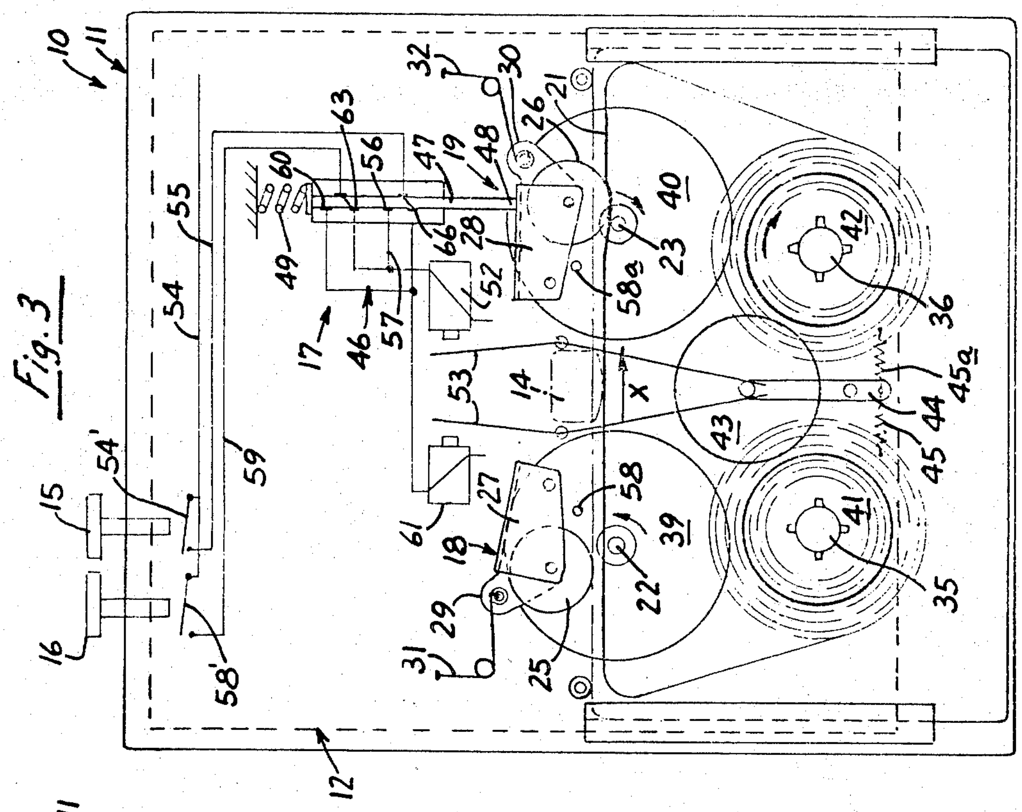
FIG. 3 is a plan view similar to FIG. 1 showing a tape being driven at normal recording playback speed in the direction X or to the right as viewed.

The transport 10 is capable of driving the sound tape 21 in either of two directions, W or X, as shown in FIGS. 1 and 3, at a normal recording or playback speed. When the tape 21 is being driven at a normal speed in the direction W, as shown in FIG. 1, the displaceable arm 27 is located in the illustrated position with a pinch roller 25 journalled thereupon urging the tape 21 into engagement with the revolving tape-driving capstan 22; the opposite displaceable arm 28 is located as shown with its associated pinch roller 26 clear of the moving tape 21. It will be seen from FIG. 3 that when the tape 21 is driven in an opposite direction X at a normal recording or playback speed to that indicated in FIG. 1, the opposite displaceable arm 28 is located with its associated pinch roller 26 engaging the tape 21 and urging it against the associated capstan 23 while the first displaceable arm 27 is located with its associated pinch roller 25 out of contact with the tape 21.

Figure 4:
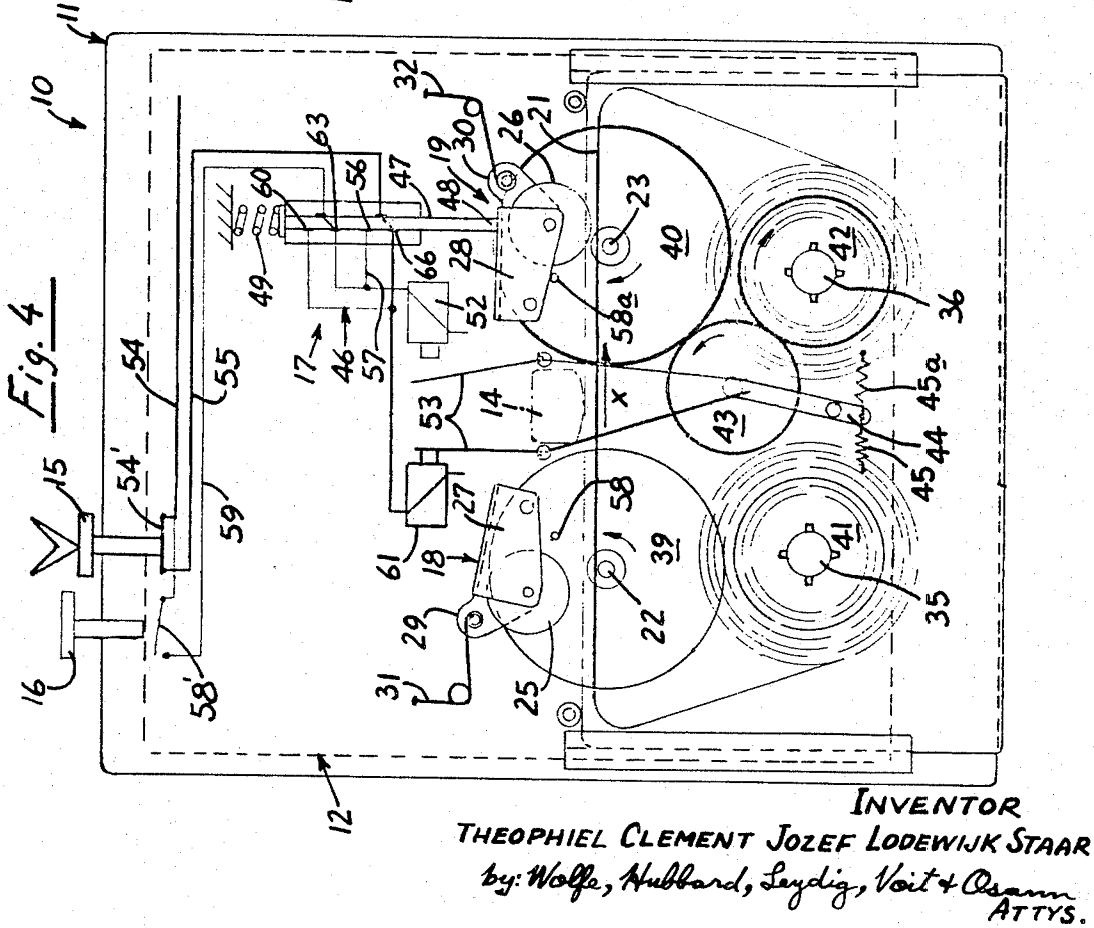
FIG. 4 is a view similar to FIG. 2 showing a tape being driven rapidly to the right in the direction X.

For rapidly driving the tape in either direction, the transport is provided with a rapid tape drive including two fly wheels 39 and 40 rotatable in opposite directions, spindle drive rollers 41 and 42, and a shiftable idler 43. The idler 43 is mounted upon a pivotable lever 44, so that it may be shifted either into simultaneous engagement with the fly wheel 39 and the spindle drive roller 41, as illustrated in FIG. 2, or into simultaneous engagement with the fly wheel 40 and spindle drive roller 42, as illustrated in FIG. 4. When the rapid drive is not engaged, the opposed springs 45 and 45*a* urge the lever 44 and the idler 43 journalled thereon into a non-operating position.

In carrying out this invention, provision is made for relating the rapid forward and rewind drive function to the direction of tape movement when the fast drive controls are actuated. In the present case means are provided for sensing the direction of tape movement at normal speed by responding to the position of the displaceable pinch roller arms 27, 28. As herein shown in FIGS. 1–4, the switching means 17 is responsive to the position of the displaceable arms 27, 28, so as to drive a spindle and associated take tape-up reel in a forward direction at high speed when the fast forward actuator 15 is engaged.

For accomplishing fast forward drive engagement and to drive the other spindle and associated take-up reel in a reverse direction when the fast rewind actuator 16 is engaged, a change-over switch 46 is provided in the circuitry 17. The change-over switch 46 includes a slide 47, the end 48 of which engages the displaceable arm 28. As illustrated, biasing means 49 urge the slide 47 into continual contact with the associated displaceable arm 28. Thus, when the displaceable arm 28 is rotated into its upward position and the tape 21 is being driven in the direction W, this will be represented by the post 47 which will also be located in a relatively raised position as seen in FIGS. 1 and 2. Conversely, when the displaceable arm 28 is located in its relatively lower position, the slide 47 is also located in a relatively lower position, as seen in FIGS. 3 and 4.

When the fast forward drive push button 15 is displaced or actuated as seen in FIG. 2, the plate assembly 12 is first moved to carry the cassette in the direction B away from the playback head 14 and pinch rollers to a position in which the tape is free and clear for rapid movement, the active pinch roller assembly 18 having followed the plate assembly 12 until it bears against the stop 58. This position of the plate assembly 12 and pinch roller assembly 18 after to manual actuation of the push button 15, is depicted in FIG. 2, although the mechanism to achieve the plate movement is not shown. Such mechanism may take any desired form, for example, the mechanism described in Staar U.S. Pats. Nos. 3,385,534, 3,429,519 or 3,488,058, or it may be similar to the mechanism in FIGS. 5–8 hereof. Further, in response to manual actuation of the fast forward push button 15, an electromagnet 52 is energized by the switching means 17. The electromagnet 52, when energized, draws a pivotable arm mechanism 53, thus shifting the idler 43 into position for driving the tape 21 at a high speed in the same direction in which the tape was traveling at normal playing speed when the fast forward control was actuated. Electrical power is delivered to the solenoid 52 through a supply wire 54, the switch contact 54′ closed by the depressed actuator 15, the switch lead 55, the closed contacts 56, and electromagnet lead 57.

Now referring to the fast reverse drive and controls therefor, when the fast reverse actuator or push button 16 is actuated in accordance with the invention, the tape is driven rapidly in the direction opposite to that in which it was moving when the push button was actuated. Actuation of the push button 16 first moves the movable plate assembly 12 and tape 21 along the path B away from the pinch roller assemblies 18 and 19, thereby disengaging the normal speed drive from the tape. In the illustrated device, when the fast rewind actuator 16 is depressed, electrical power is delivered from the supply wire 54 through the closed contacts 58′, along an alternate switch lead 59, through alternate contacts 60, so as to energize an opposing electromagnet 61. The energization of this opposing electromagnet 61 rotates the arm 53 toward it, as shown in FIG. 4 thereby engaging the described fast tape drive.

When the tape 21 is being driven in the direction X at the normal speed as seen in FIG. 3, the displaceable arm 28 and slide 47 are located in a relatively depressed position. Under such circumstances, alternate contacts 63 and 66 are closed within the switch 17. When the fast forward control 15 is actuated, as illustrated in FIG. 4, electrical power is delivered along the supply wire 54 through closed contacts 54′ and switch lead 55 to contacts 66 within the switch 17, thereby energizing the opposing electromagnet 61. Such energization, as may be seen, displaces the lever 53 and appropriately engages the rapid tape drive so as to drive the tape rapidly in the direction X. When the fast rewind actuator 16 is depressed, the circuit including contacts 63 is closed, thereby energizing the electromagnet 52, and orienting the rapid drive as seen in FIG. 2.

When the moving tape is driven to one of its ends, automatic devices not shown change the direction of tape travel and, in so doing, alter the locations of the displaceable arms 27 and 28. If the tape is being driven rapidly, such action will automatically change the direction of tape travel, even though the rapid drive is engaged.

An alternate embodiment of the invention is shown in FIGS. 5–8, wherein a mechanical linkage 80 is included to appropriately link the fast forward or fast rewind actuator 15 or 16, with the rapid tape drive. An embossment 82, carried upon a plunger 83, is positioned in response to the displaceable pinch roller arm 28. The displaceable arm 28 may be moved, by means not but exemplified in Staar U.S. Pat. No. 3,604,714 shown, between the lowered position shown in FIGS. 7 and 8 to the raised position shown in FIGS. 5 and 6. The downward motion of the embossment 82 via the rocker arm 84 and plunger 83 forces apart the plungers locator slides 87 and 88, carrying the plunger 89 and 90 from the relatively adjacent position shown in FIGS. 7 and 8 to the relatively separated position shown in FIGS. 5 and 6.

For selectively engaging either of the two idler rollers 92 or 93, each of the plungers 89 and 90 terminates in an arm 95 and 96, respectively. Each arm is formed, in turn, with two inclined cam surfaces 98, 99, 100, and 101.

Figure 6:
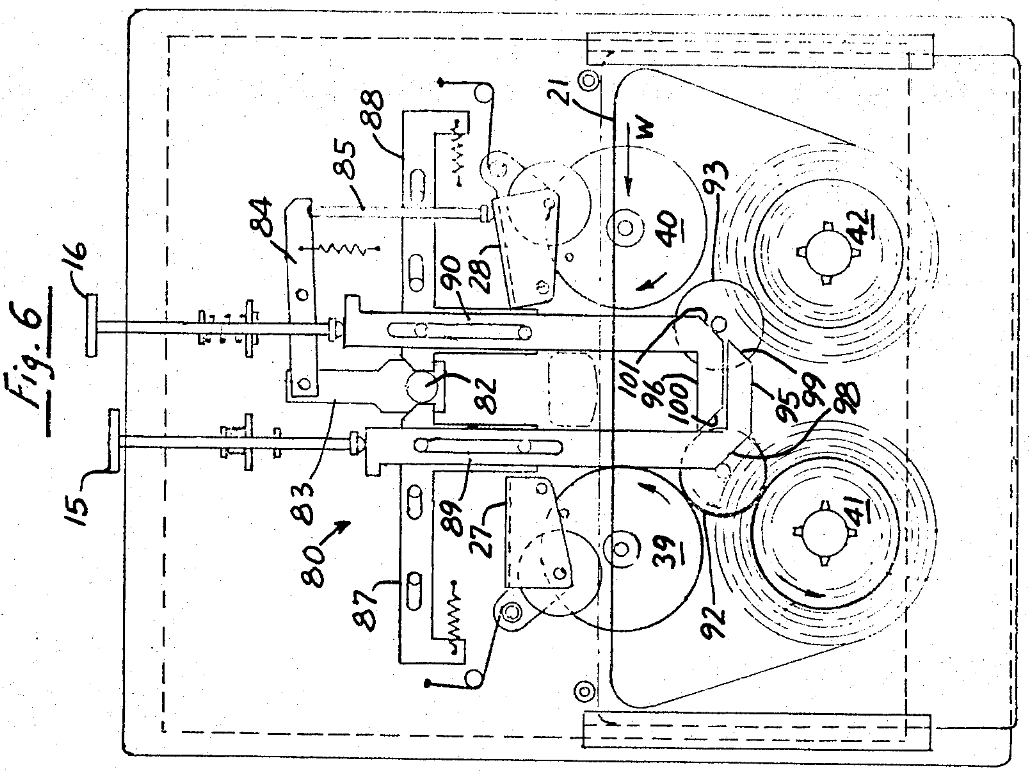
FIG. 6 is a view similar to FIG. 5 showing the tape being driven rapidly in the direction W to the left as viewed.
Figure 5:
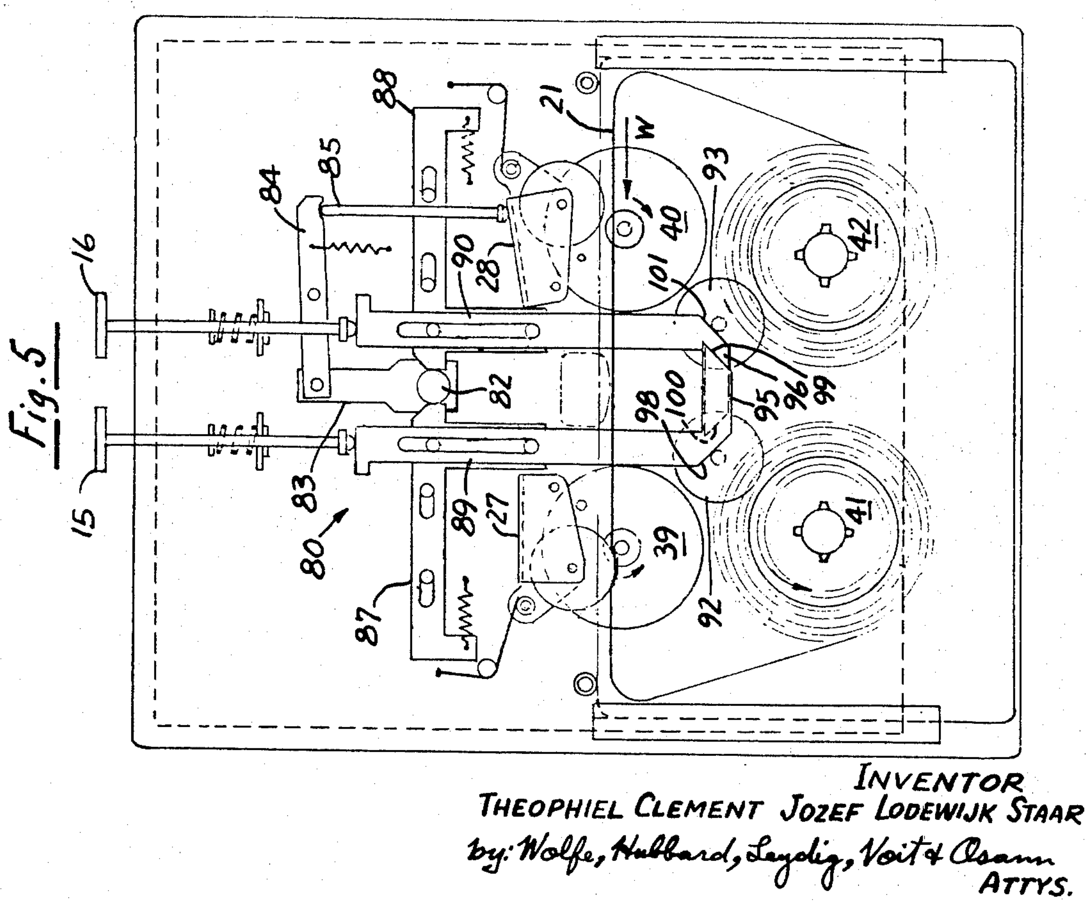
FIG. 5 is a plan view similar to FIG. 1 showing a tape transport embodying an alternate form of the invention, the transport carrying a tape which is being driven at normal recording or playback speed in the direction W or to the left as viewed.
Figure 7:
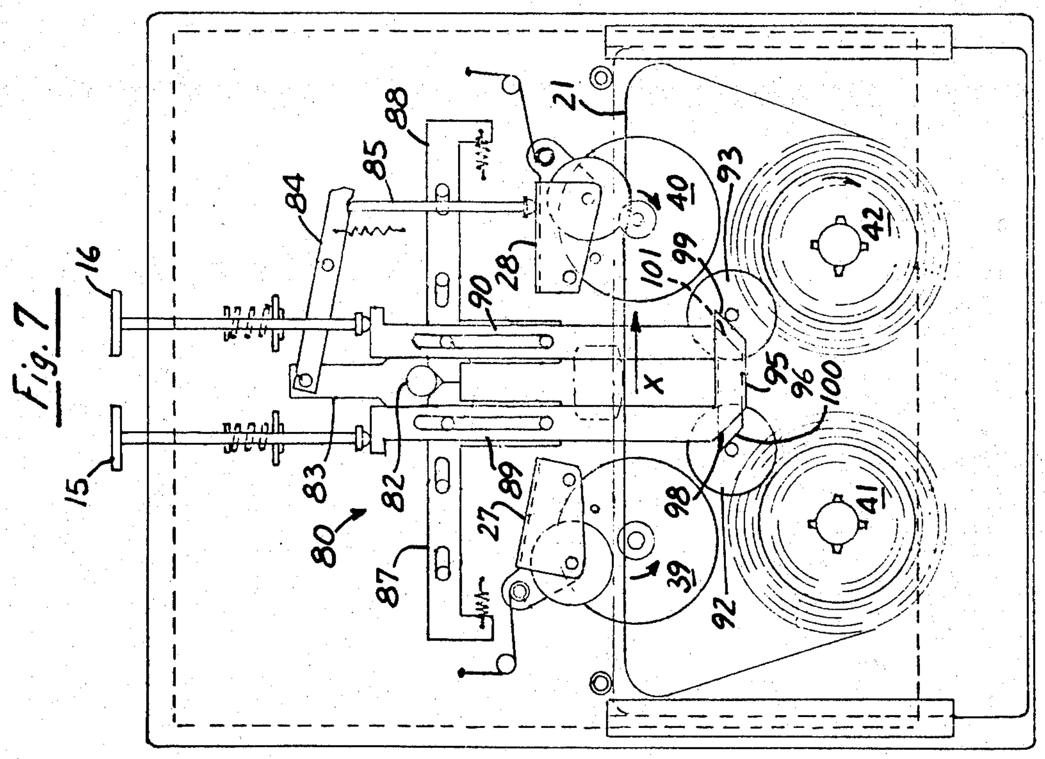
FIG. 7 is a figure similar to FIG. 6 showing the tape being driven at normal recording or playback speed to the right in the direction X.
Figure 8:
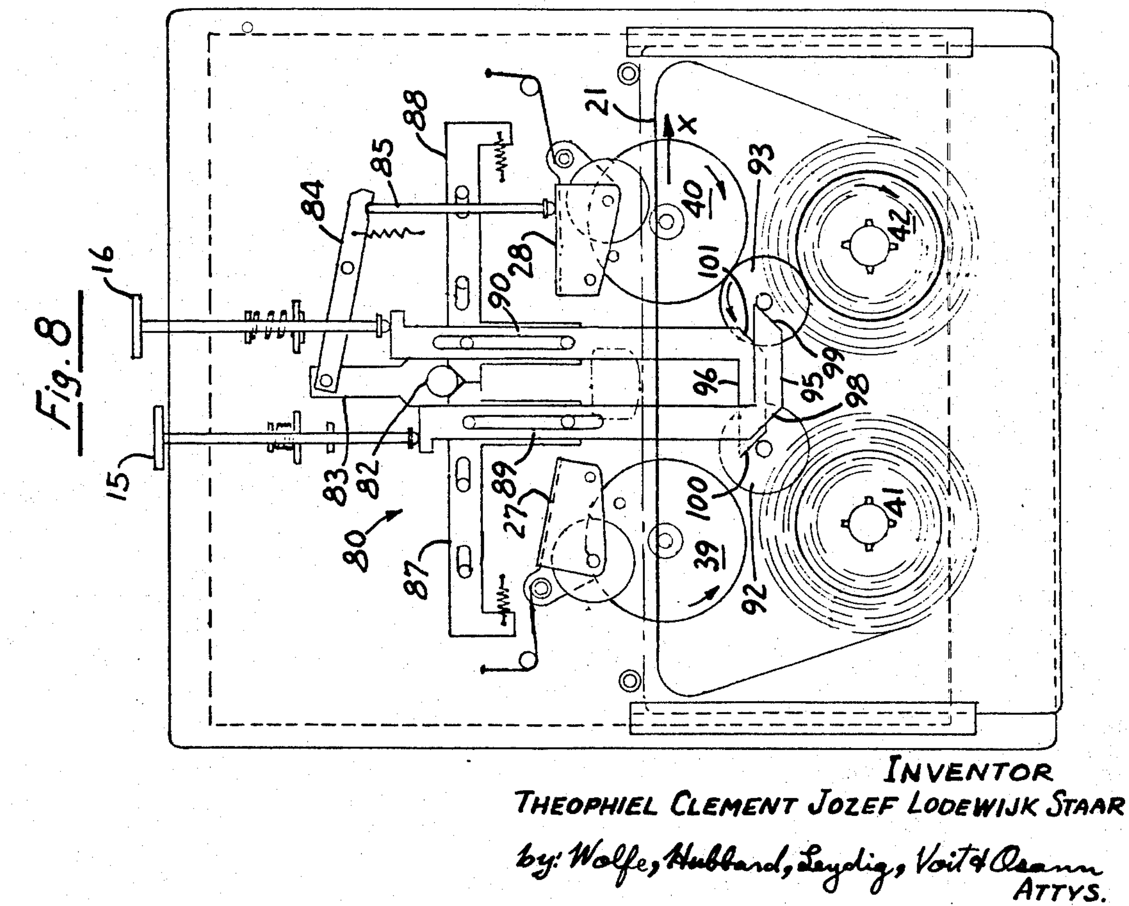
FIG. 8 is a view similar to FIG. 6 showing the tape being driven rapidly to the right in the direction X as viewed.

It can be seen that, when the tape 21 is moving in the direction W, as shown in FIGS. 5 and 6, depression of the fast forward actuator 15 will cause the inclined surface 98 to cam the idler 92 into engagement with the fly wheel 39 and drive roller 41, so as to drive the tape rapidly in the same direction as that in which it was moving when the actuator was depressed. When the tape is driven in the direction X and the plungers are positioned as shown in FIGS. 7 and 8, however, depression of the fast forward actuator 15 will cause the inclined surface 99 to cam the opposite idler roller 93 into engagement with the associated fly wheel 40 and drive roller 42 so as to move the tape at fast speed in the same direction X. Actuation of the fast rewind actuator 16 operates in similar manner to cause the tape to be driven rapidly in a direction opposite to that in which it was moving when the rewind actuator 16 was actuated.

I claim as my invention:

1. A fast forward and fast rewind drive device for a magnetic tape recording and playback apparatus, the apparatus having a pair of normal speed tape drive means which are alternately engageable for moving the tape from reel to reel at a normal speed in either of two directions, the drive device including:

fast speed drive means selectively engageable to move the tape from reel to reel at fast speed in either of said directions;

a fast forward manual actuator;

a fast rewind manual actuator;

control means operated by said manual actuators to selectively engage said drive means; and sensing means included in said control means for sensing which of said normal speed tape drive means is engaged to move the tape at normal speed when the actuators are actuated and connected to control the selective engagement of said fast speed drive means dependent on the direction of tape movement, so that actuation of the fast forward manual actuator operates said control means to engage the fast speed drive means to move the tape from reel to reel at fast speed in the same direction regardless of which direction it happens to be moving at normal speed when the fast forward actuator is actuated, and actuation of the fast rewind manual actuator operates said control means to engage the fast speed drive means to move the tape from reel to reel at fast speed in the direction opposite to the direction of tape movement regardless of which direction it happens to be moving at normal speed when the fast rewind actuator is actuated.

2. A fast forward and fast rewind drive device according to claim 7 for a magnetic tape recording and playback apparatus, in which said selectively engageable fast speed drive means to move the tape from reel to reel at fast speed in either of two directions includes:

oppositely rotating fast speed drive rollers, a pair of drivable spindles for mounting tape reels and associated, respectively, with said drive rollers, and a shiftable idler roller for selectively coupling each spindle to its associated drive roller;

said control means operated by said manual actuators to selectively engage said fast speed drive means includes a pair of cams for shifting said idler rollers, and linkages selectively connecting each of said manual actuators to one or the other of said cams; and said sensing means included in said control means for sensing which of said normal speed tape drive means is engaged when the actuators are actuated includes a member for controlling the selective connections provided by said linkages between said manual actuators and said cams dependent on the direction of tape movement at normal speed, so that actuation of the fast forward manual actuator shifts an idler roller to engage the fast speed drive means to drive one of the spindles and move the tape from reel to reel at fast speed in the same direction regardless of which direction it happens to be moving at normal speed when the fast forward actuator is actuated, and actuation of the fast rewind manual actuator shifts an idler roller to engage the fast speed drive means to drive the other spindle and move the tape from reel to reel at fast speed in the direction opposite to the direction of tape movement regardless of which direction it happens to be moving at normal speed when the fast rewind actuator is actuated.

3. A fast forward and fast rewind drive device according to claim 7 for a magnetic tape recording and playback apparatus, in which said selectively engageable fast speed drive means to move the tape at fast speed in either of two directions includes:

oppositely rotating fast speed drive rollers, a pair of drivable spindles for mounting tape reels and associated, respectively, with said drive rollers, and shiftable idler roller means for selectively coupling each spindle to its associated drive roller;

said control means operated by said manual actuators to selectively engage said drive means includes a pair of solenoids for shifting said idler roller means, and electrical connections selectively connecting each of said manual actuators to one or the other of said solenoids;

and said sensing means included in said control means for sensing which of said normal speed tape drive means is engaged when the actuators are actuated includes a switch member for controlling the selective connections provided between said manual actuators and said solenoids dependent on the direction of tape movement at normal speed, so that actuation of the fast forward manual actuator shifts said idler roller means to engage the fast speed drive means to drive one of the spindles and move the tape from reel to reel at fast speed in the same direction regardless of which direction it happens to be moving at normal speed when the fast forward actuator is actuated, and actuation of the fast rewind manual actuator shifts said idler roller means to engage the fast speed drive means to drive the other spindle and move the tape from reel to reel at fast speed in the direction opposite the direction of tape movement regardless of which direction it happens to be moving at normal speed when the fast rewind actuator is actuated.

4. A fast forward and fast rewind drive device for a magnetic tape recording and playback apparatus, the apparatus having a pair of normal speed tape drive means which are alternately engageable for moving the tape at a normal speed in either or two directions, the drive device including fast speed drive means selectively engageable to move the tape from reel to reel at fast speed in either of said directions, sensing means for sensing which of said normal speed tape drive means is engaged to move the tape at normal speed, manually actuatable fast forward control means including said sensing means and connected by said sensing means to engage said fast speed drive means to move the tape from reel to reel at fast speed in the same direction as it is moving at normal speed when the fast forward control means is actuated regardless of which direction it happens to be moving at normal speed when the fast forward control means is actuated, and manually actuatable fast rewind control means including said sensing means and connected by said sensing means to engage said fast speed drive means to move the tape from reel to reel at fast speed in the direction opposite to the direction of tape movement at normal speed when the fast rewind control means is actuated regardless of which direction it happens to be moving at normal speed when the fast rewind control means is actuated.

* * * * *